US009054583B2

(12) United States Patent
Nagasawa et al.

(10) Patent No.: US 9,054,583 B2
(45) Date of Patent: Jun. 9, 2015

(54) POWER-SUPPLY APPARATUS

(71) Applicant: RENESAS ELECTRONICS CORPORATION, Kanagawa (JP)

(72) Inventors: Toshio Nagasawa, Yokohama (JP); Yoshitaka Onaya, Kawasaki (JP); Koji Saikusa, Kawasaki (JP); Shin Chiba, Kawasaki (JP)

(73) Assignee: Renesas Electronics Corporation, Kanagawa (JP)

( * ) Notice: Subject to any disclaimer, the term of this patent is extended or adjusted under 35 U.S.C. 154(b) by 8 days.

(21) Appl. No.: 14/096,499

(22) Filed: Dec. 4, 2013

(65) Prior Publication Data

US 2014/0191737 A1    Jul. 10, 2014

(30) Foreign Application Priority Data

Jan. 9, 2013    (JP) .................................. 2013-001642

(51) Int. Cl.
*H02M 3/158* (2006.01)
*H02M 3/156* (2006.01)
*H02M 1/00* (2006.01)

(52) U.S. Cl.
CPC ............ *H02M 3/1584* (2013.01); *H02M 3/156* (2013.01); *H02M 3/1588* (2013.01); *H02M 2001/0009* (2013.01); *Y02B 70/1466* (2013.01)

(58) Field of Classification Search
USPC ........................ 323/222, 225, 271, 282–290
See application file for complete search history.

(56) References Cited

U.S. PATENT DOCUMENTS

| 3,969,682 | A | * | 7/1976 | Rossum .......................... 330/85 |
| 5,731,694 | A | * | 3/1998 | Wilcox et al. ................. 323/287 |
| 7,492,132 | B2 | * | 2/2009 | Kuroiwa et al. ............. 323/222 |
| 2007/0103005 | A1 | | 5/2007 | Nagasawa et al. |
| 2009/0039856 | A1 | * | 2/2009 | Wang et al. .................... 323/285 |
| 2009/0224732 | A1 | | 9/2009 | Kudo et al. |
| 2011/0169464 | A1 | * | 7/2011 | Michishita et al. ........... 323/271 |
| 2013/0307511 | A1 | * | 11/2013 | De Vries ....................... 323/284 |

FOREIGN PATENT DOCUMENTS

| JP | 2007-215391 A | 8/2007 |
| JP | 2009-219184 A | 9/2009 |

* cited by examiner

*Primary Examiner* — Jessica Han
(74) *Attorney, Agent, or Firm* — Mattingly & Malur, PC

(57) ABSTRACT

A power-supply apparatus according to an aspect includes an inductor, a transistor that supplies, in an on-state, a current to the input side of the inductor, a second transistor that becomes, when the first transistor is in an off-state, an on-state and thereby brings the input side of the inductor to a predetermined potential, a signal generation unit that generates voltage signals corresponding to a current flowing to the inductor, an amplifier that outputs a current according to the voltage signals, a converter that converts the current output from the amplifier into a voltage signal, and a control unit that controls the transistors based on a first feedback signal corresponding to the voltage on the output side of the inductor and the voltage signal, which is used as a second feedback signal.

12 Claims, 8 Drawing Sheets

POWER-SUPPLY APPARATUS

CROSS-REFERENCE TO RELATED APPLICATIONS

This application is based upon and claims the benefit of priority from Japanese patent application No. 2013-001642, filed on Jan. 9, 2013, the disclosure of which is incorporated herein in its entirety by reference.

BACKGROUND

The present invention relates to a power-supply apparatus, and in particular to a power-supply apparatus using a peak current control scheme.

In recent years, because of the demand for reducing the sizes and the power consumptions of semiconductor devices, switching power-supply apparatuses using switching circuits that are repeatedly turned on and off at regular intervals have been widely used. As such switching power-supply apparatuses, DCDC converters using PWM (Pulse Width Modulation) control for adjusting the duty ratio of a pulse signal to be input to a switching circuit have been known.

Japanese Unexamined Patent Application Publication No. 2007-215391 discloses a technique for a switching power-supply apparatus capable of responding at high speed and operating with stability. Japanese Unexamined Patent Application Publication No. 2009-219184 discloses a technique for implementing a multi-phase power supply at low cost.

SUMMARY

In a switching power-supply apparatus, electric power to be supplied to a load is controlled by switching a high-potential side power MOSFET (Metal-Oxide-Semiconductor Field-Effect Transistor) (hereinafter referred to as "high-potential side FET) and a low-potential side power MOSFET (hereinafter referred to as "low-potential side FET") in a complementary manner. Note that in a peak current control type power-supply apparatus, a current flowing to the high-potential side FET is detected and feedback control is performed by using the information of the detected current.

In the technique disclosed in Japanese Unexamined Patent Application Publication No. 2007-215391, a sense MOSFET (hereinafter referred to as "sense FET") is used in order to detect the current flowing to the high-potential side FET. Since the sense FET needs to have a high detection accuracy, it is necessary to use a purpose-built sense FET corresponding to the high-potential side FET.

However, the present inventors have found the following problem. Namely, there is a problem that when a purpose-built sense FET corresponding to the high-potential side FET is used, other high-potential side FETs (general-purpose high-potential side FETs) that do not correspond to the purpose-built sense FET cannot be used. It is necessary to select the high-potential side FET and the low-potential side FET according to the load to which electric power is supplied. However, when a purpose-built sense FET is used, a general-purpose high-potential side FET cannot be used because the sense FET is set with a certain high-potential side FET. Therefore, there is a problem that the high-potential side FET to be used cannot be freely selected.

Other problems to be solved as well as novel features will be more apparent from the following description and the accompanying drawings.

A first aspect of the present invention is a power-supply apparatus in which a first voltage signal corresponding to a current flowing to an inductor is generated in a signal generation unit, and the first voltage signal is converted into a current signal by a trans-conductance amplifier. Further, the current signal output from the trans-conductance amplifier is converted into a second voltage signal by using a converter, and this second voltage signal is used as a feedback signal.

According to the above-described aspect, it is possible to provide a power-supply apparatus capable of freely selecting a power MOSFET to be used.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

First Embodiment

A power-supply apparatus according to a first embodiment is explained hereinafter with reference to the drawings.

Figure 1:
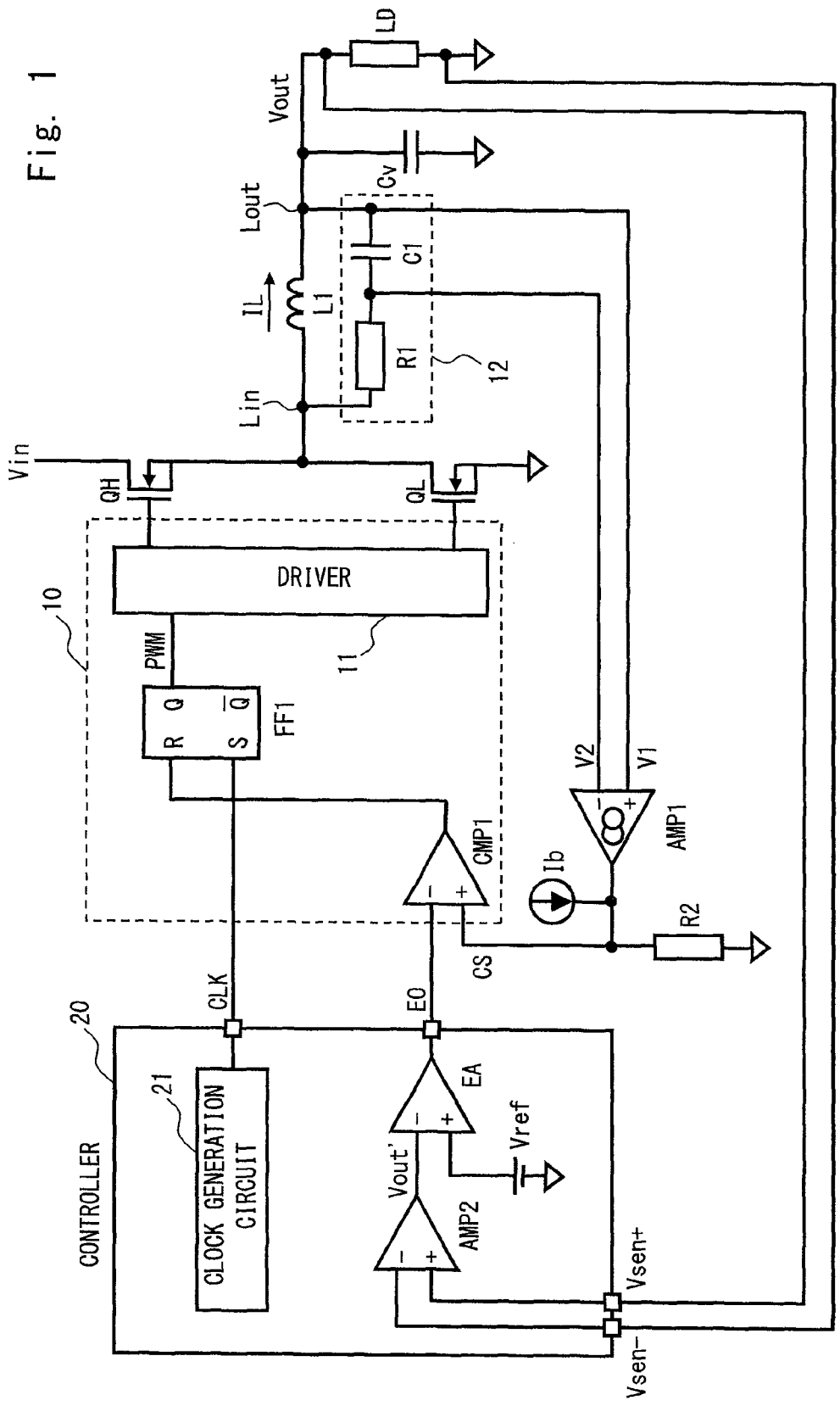
FIG. 1 is a circuit diagram showing a power-supply apparatus according to a first embodiment.

FIG. 1 is a circuit diagram showing a power-supply apparatus according to this embodiment. As shown in FIG. 1, the power-supply apparatus according to this embodiment includes, at least, an inductor L1, a high-potential side power MOSFET (QH: first transistor), a low-potential side power MOSFET (QL: second transistor), a signal generation unit 12, a trans-conductance amplifier AMP1, a converter R2, and a control unit 10.

The power-supply apparatus according to this embodiment supplies an output voltage Vout obtained by lowering the voltage of an input voltage Vin, to a load LD. The output voltage Vout to be supplied to the load LD can be adjusted by controlling the on/off timings of the high-potential side FET (QH) and the low-potential side FET (QL). That is, the high-potential side FET (QH) and the low-potential side FET (QL) are configured so that they are turned on/off in a complementary manner. Further, by controlling the duty ratio of these on/off operations, the output voltage Vout can be adjusted. The duty ratio is determined by detecting the output voltage Vout to be supplied to the load LD and the current IL, and feeding back these two detection results. That is, the power-supply apparatus according to this embodiment is a power-supply apparatus using a peak current control scheme.

The high-potential side FET (QH) is disposed between the input voltage Vin and the input side Lin of the inductor L1. The low-potential side FET (QL) is disposed between the input side Lin of the inductor L1 and the ground potential.

When the high-potential side FET (QH) is in an on-state and the low-potential side FET (QL) is in an off-state, a current is supplied to the input side Lin of the inductor L1. In this state, a current IL flows to the inductor L1 and this current is supplied to the load LD. A capacitive element Cv is disposed between the output side Lout of the inductor L1 and the ground potential. By disposing the capacitive element Cv, the output voltage Vout is smoothed.

On the other hand, when the high-potential side FET (QH) is in an off-state and the low-potential side FET (QL) is in an on-state, the input side Lin of the inductor L1 is brought to a predetermined potential. That is, since the low-potential side FET (QL) becomes an on-state, the input side Lin of the inductor L1 is connected to the ground potential. Therefore, the counter electromotive force that occurs in the inductor L1 can be clamped. Each of the high-potential side FET (QH) and the low-potential side FET (QL) can be formed by using, for example, an N-channel type vertical power MOSFET.

The signal generation unit 12 generates voltage signals V1 and V2 (first voltage signals) corresponding to the current IL (first current) flowing to the inductor L1. Note that the voltage signals V1 and V2 correspond to a voltage difference generated by the DC (Direct Current) resistive component DCR of the inductor L1. That is, the inductor L1 includes an inductive component L and the DC resistive component DCR. Therefore, by detecting the potential difference between the input side and the output side of this DC resistive component DCR, the current flowing through the inductor L1 can be detected.

The signal generation unit 12 can be formed by using a CR-circuit including a capacitive element C1 and a resistive element R1 connected in series. The CR-circuit is connected in parallel with the inductor L1. As shown in FIG. 1, one end of the resistive element R1 (first resistive element) provided in the CR-circuit is connected to the input side Lin of the inductor L1, and one end of the capacitive element C1 is connected to the output side Lout of the inductor L1. Further, the other end of the resistive element R1 and the other end of the capacitive element C1 are connected to each other. The one end of the capacitive element C1 is connected to the non-inverting input of the trans-conductance amplifier AMP1 (hereinafter referred to as "amplifier AMP1"), and the other ends of the resistive element R1 and the capacitive element C1 are connected to the inverting input of the amplifier AMP1. That is, the potential difference across the capacitive element C1 is output to the amplifier AMP1 as the voltage signals V1 and V2.

In the following explanation, the inductance of the inductor L1 is represented as "L1"; the DC resistive component DCR is represented as "R0"; the capacitance of the capacitive element C1 is represented as "C1"; and the resistance of the resistive element R1 is represented as "R1". It is necessary to make the time constant L1/R0 of the inductor L1 equal to the time constant R1*C1 of the CR-circuit. Therefore, the capacitance C1 of the capacitive element C1 and the resistance R1 of the resistive element R1 of the signal generation unit 12 are adjusted so that the relation "L1/R0=R1*C1" is satisfied.

The amplifier AMP1 outputs a current (second current) according to the voltage signals V1 and V2 generated by the signal generation unit 12. That is, the amplifier AMP1 has such a property that it outputs a current in proportion to the input voltage. In this case, the amplifier AMP1 outputs a current in proportion to the potential difference across the capacitive element C1.

Then, the current output from the amplifier AMP1 is converted into a voltage signal CS (second voltage signal) by the converter R2. For example, the converter R2 can be formed by using a resistive element (second resistive element) whose one end is connected to the output side of the amplifier AMP1 and whose other end is connected to the ground.

Further, a bias current source Ib for supplying a bias current may be disposed on the output side of the amplifier AMP1. When the bias current source Ib is provided, a voltage signal that is obtained by converting the total of the current output from the amplifier AMP1 and the current supplied from the bias current source by the converter R2 is used as the voltage signal CS. In other words, the voltage signal CS can be positively biased by an amount equivalent to the current supplied from the bias current source.

There are cases where a negative ripple current occurs in the inductor L1. In such cases, the resistive element R2, which is the converter, needs to generate a negative voltage. However, when the amplifier AMP1 is configured in such a manner that the ground potential is used as the reference voltage, the negative voltage cannot be generated. In such cases, the voltage signal CS can be kept in a positive value range at all times by disposing the bias current source Ib on the output side of the amplifier AMP1.

The control unit 10 controls the high-potential side FET (QH) and the low-potential side FET (QL) based on a first feedback signal EO corresponding to the voltage Vout on the output side Lout of the inductor L1 and the voltage signal CS (second feedback signal).

Note that the first feedback signal EO is generated by a controller 20. The controller 20 includes an amplifier AMP2 and an error amplifier EA. A potential Vsen− (ground potential) on the low-potential side of the load LD is supplied to the inverting input of the amplifier AMP2, and a potential Vsen+ (Vout) on the high-potential side of the load LD is supplied to the non-inverting input. The amplifier AMP2 outputs a potential Vout' corresponding to the potential difference between the potentials Vsen− and Vsen+. For example, the amplifier AMP2 can be formed by using an amplifier that outputs a potential that is obtained by multiplying the potential difference between the potentials Vsen− and Vsen+ by one. In this case, since the potential Vsen− is the ground potential, the output Vout' of the amplifier AMP2 is substantially equal to the output voltage Vout.

A reference voltage Vref is supplied to the non-inverting input of the error amplifier EA, and the output Vout' of the amplifier AMP2 is supplied to the inverting input. Further, the error amplifier EA outputs the first feedback signal EO corresponding to the difference between the reference voltage Vref and the output Vout' of the amplifier AMP2.

A comparator CMP1 provided in the control unit 10 receives the first feedback signal EO and the second feedback signal CS (i.e., the voltage signal CS) and outputs a comparison result of these feedback signals to a reset input R of a flip-flop FF1. Specifically, the comparator CMP1 outputs a high-level signal ("1") to the reset input R of the flip-flop FF1 at a timing at which the second feedback signal CS becomes larger than the first feedback signal EO.

A clock signal CLK output from a clock generation circuit 21 provided in the controller 20 is supplied to a set input S of the flip-flop FF1. For example, the clock signal CLK is a trigger signal. Further, the flip-flop FF1 outputs, from its non-inverting output Q, a signal PWM for PWM control to a driver 11. The driver 11 drives the high-potential side FET (QH) and the low-potential side FET (QL) according to the signal PWM. For example, when the signal PWM is at a high level, the driver 11 turns on the high-potential side FET (QH) and turns off the low-potential side FET (QL). Further, when the signal PWM is at a low level, the driver 11 turns off the high-potential side FET (QH) and turns on the low-potential side FET (QL).

Figure 2:
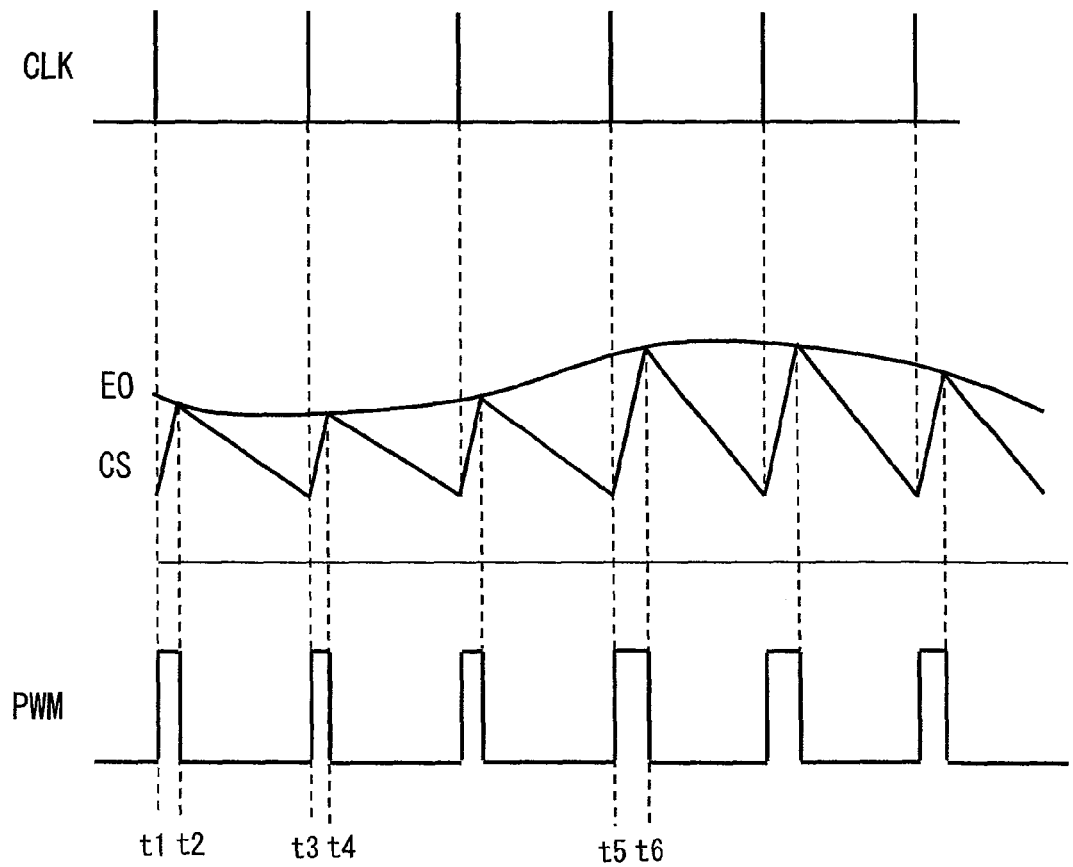
FIG. 2 is a timing chart for explaining an operation of a power-supply apparatus according to a first embodiment.

Next, an operation of the power-supply apparatus according to this embodiment is explained with reference to a timing chart shown in FIG. 2. At a timing t1, when a high-level clock signal CLK is supplied from the clock generation circuit 21 to the set input S of the flip-flop FF1, the flip-flop FF1 outputs a high-level signal PWM from its non-inverting output Q. At this point, since the second feedback signal CS is smaller than the first feedback signal EO, the output of the comparator CMP1 remains at the low level. The signal PWM remains at the high level until a high-level signal is supplied to the reset input R.

When the signal PWM becomes a high level, the driver 11 turns on the high-potential side FET (QH) and turns off the low-potential side FET (QL). That is, when the voltage of the first feedback signal EO is larger than the voltage of the second feedback signal CS, the control unit 10 turns on the high-potential side FET (QH) and turns off the low-potential side FET (QL). As a result, a current is supplied to the inductor L1 and this current is supplied to the load LD.

The signal generation unit 12 outputs voltage signals V1 and V2 corresponding to the current IL flowing through the inductor L1. The amplifier AMP1 outputs a current according to the voltage signals V1 and V2 output from the signal generation unit 12. Then, the current output from the amplifier AMP1 is converted into the voltage signal CS, which is the second feedback signal, by the converter R2. When the high-potential side FET (QH) is in an on-state, the current continues to be supplied to the inductor L1. Therefore, the second feedback signal CS, which corresponds to the current flowing to the inductor L1, continues to increase.

Further, since the current continues to be supplied to the inductor L1, the output voltage Vout also rises. Therefore, the first feedback signal EO corresponding to the output voltage Vout decreases. Note that the output voltage Vout and the first feedback signal EO have such a relation that when the output voltage Vout increases, the first feedback signal EO decreases, and when the output voltage Vout decreases, the first feedback signal EO increases.

Then, at a timing t2, when the second feedback signal CS becomes larger than the first feedback signal EO, the comparator CMP1 outputs a high-level signal ("1") to the reset input R of the flip-flop FF1. Upon receiving the high-level signal, the flip-flop FF1 lowers its non-inverting output Q to a low level. Therefore, the signal PWM becomes a low level.

When the signal PWM becomes a low level, the driver 11 turns off the high-potential side FET (QH) and turns on the low-potential side FET (QL). As a result, the input side Lin of the inductor L1 is connected to the ground potential, and the counter electromotive force that occurs in the inductor L1 is clamped.

Since the high-potential side FET (QH) remains in the off-state after that, no current is supplied to the input side Lin of the inductor L1 through the high-potential side FET (QH). Therefore, the state where the second feedback signal CS is smaller than the first feedback signal EO is maintained.

Then, at a timing t3, when a high-level clock signal CLK is supplied from the clock generation circuit 21 to the set input S of the flip-flop FF1 again, the flip-flop FF1 outputs a high-level signal PWM from its non-inverting output Q. At this point, since the second feedback signal CS is smaller than the first feedback signal EO, the output of the comparator CMP1 remains at the low level. The signal PWM remains at the high level until a high-level signal is supplied to the reset input R. The subsequent operations are similar to the above-explained operations, and therefore a duplicated explanation is omitted.

Note that the width of the signal PWM in the timing t1 to t2 is narrower than the width of the signal PWM in the timing t5 to t6. This is because the value of the first feedback signal EO in the timing t1 to t2 is smaller than the value of the first feedback signal EO in the timing t5 to t6. That is, since the value of the output voltage Vout is larger in the timing t1 to t2 than in the timing t5 to t6, the width of the signal PWM is set to a narrower width and the duration in which the high-potential side FET (QH) is in an on-state is shorter.

Figure 3:
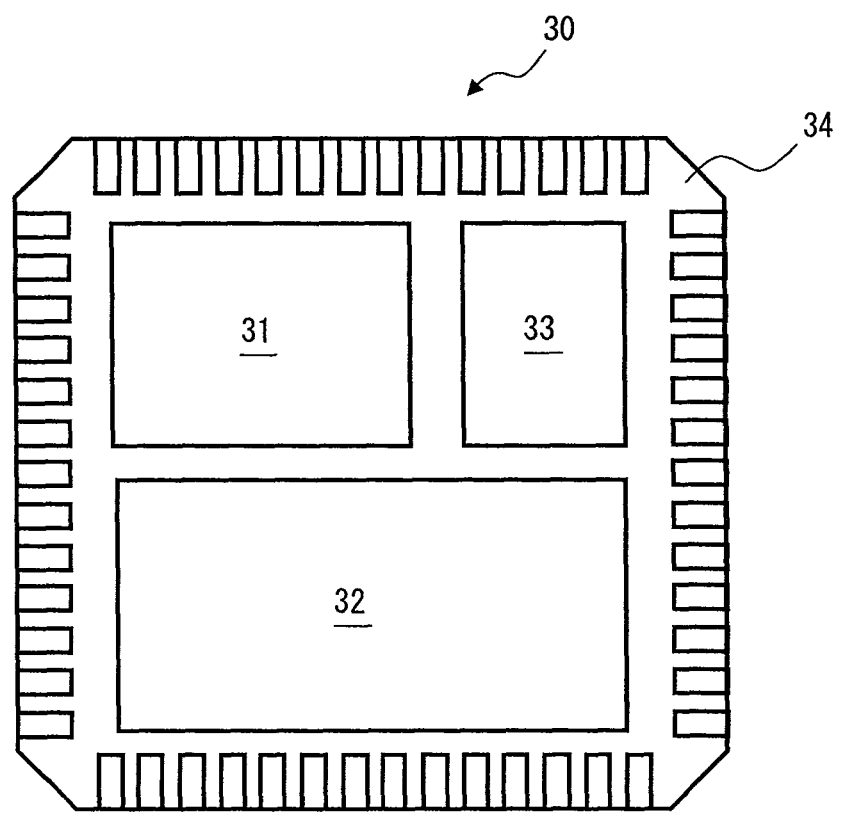
FIG. 3 is a diagram showing an example of a semiconductor integrated circuit including a power-supply apparatus.

FIG. 3 is a diagram showing an example of a semiconductor integrated circuit including a power-supply apparatus according to this embodiment. FIG. 3 shows a case where three semiconductor chips 31 to 33 are mounted on one package substrate 34 in the semiconductor integrated circuit 30. Among the three semiconductor chips, a high-potential side power MOSFET (QH) is formed, for example, in the semiconductor chip 31. A low-potential side power MOSFET (QL) is formed in the semiconductor chip 32. A control unit 10 and a trans-conductance amplifier AMP1 are formed in the semiconductor chip 33.

By forming the semiconductor chip 31 including the high-potential side power MOSFET (QH) formed therein, the semiconductor chip 32 including the low-potential side power MOSFET (QL) formed therein, and the semiconductor chip 33 including the control unit 10 and the trans-conductance amplifier AMP1 formed therein independently of each other as shown above, it is possible to arbitrarily combine these semiconductor chips 31 to 33. For example, it is possible to select the semiconductor chip 31 including the high-potential side power MOSFET (QH) formed therein and the semiconductor chip 32 including the low-potential side power MOSFET (QL) formed therein according to the load to which the power-supply apparatus supplies electric power.

As explained above, in the switching power-supply apparatus, the electric power to be supplied to the load is controlled by switching the high-potential side FET and the low-potential side FET in a complementary manner. Note that in a peak current control type power-supply apparatus, a current flowing through the high-potential side FET is detected and feedback control is performed by using the information of this detected current.

In the technique disclosed in Japanese Unexamined Patent Application Publication No. 2007-215391, a sense MOSFET (sense FET) is used to detect a current flowing through the high-potential side FET. Since the sense FET needs to have a high detection accuracy, it is necessary to use a purpose-built sense FET corresponding to the high-potential side FET.

However, there has been a problem that when a purpose-built sense FET corresponding to the high-potential side FET is used, other high-potential side FETs (general-purpose high-potential side FETs) that do not correspond to the purpose-built sense FET cannot be used. It is necessary to select the high-potential side FET and the low-potential side FET according to the load to which electric power is supplied. However, when a purpose-built sense FET is used, a general-purpose high-potential side FET cannot be used because the sense FET is set with a certain high-potential side FET. Therefore, there has been a problem that the high-potential side FET to be used cannot be freely selected.

Figure 4:
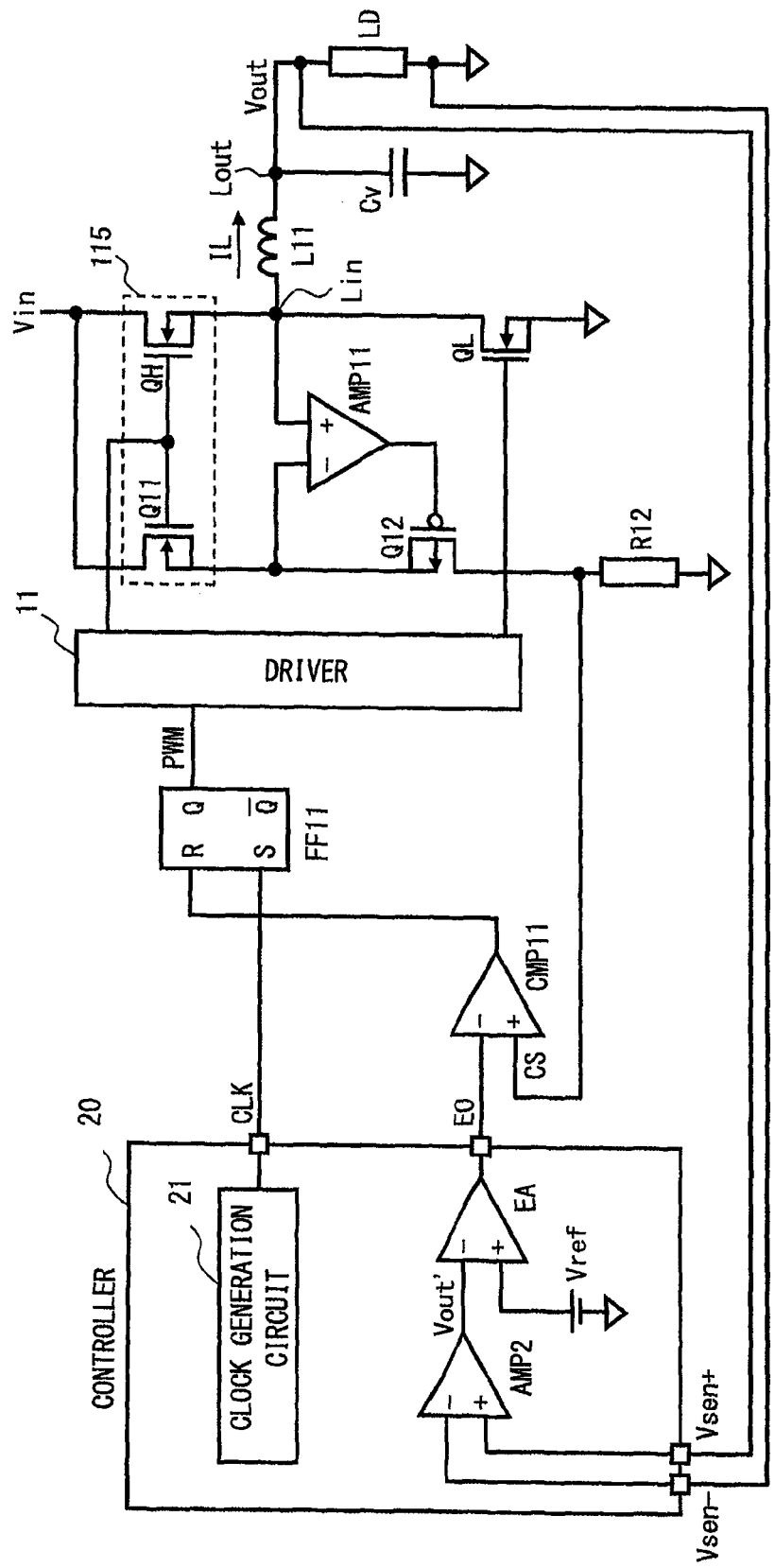
FIG. 4 is a circuit diagram showing a power-supply apparatus according to a comparative example.

FIG. 4 is a circuit diagram showing a power-supply apparatus according to a comparative example. In FIG. 4, components similar to those in the power-supply apparatus shown in FIG. 1 are denoted by the same reference numerals.

A high-potential side FET (QH) is disposed between an input voltage Vin and the input side Lin of an inductor L1. A low-potential side FET (QL) is disposed between the input side Lin of the inductor L1 and the ground potential. Further, a sense FET (Q11) for detecting a current flowing through the high-potential side FET (QH) is provided. The high-potential side FET (QH) and the sense FET (Q11) form a current-mirror circuit, and they are configured so that a current equal to 1/N of the current flowing to the high-potential side FET (QH) flows to the sense FET (Q11).

The source of the sense FET (Q11) is connected to the inverting input of an amplifier AMP11 and the source of the high-potential side FET (QH) is connected to the non-inverting input of the amplifier AMP11. Further, the output of the amplifier AMP11 is connected to the gate of a P-type FET (Q12). By disposing the amplifier AMP11, the source potential of the high-potential side FET (QH) can be made equal to the source potential of the sense FET (Q11).

Further, a feedback signal CS corresponding to the current IL can be generated by converting the drain current of the P-type FET (Q12) by using a resistive element R12. Note that a feedback signal EO is generated in a manner similar to that in FIG. 1, and therefore a duplicated explanation is omitted.

In the power-supply apparatus according to the comparative example shown in FIG. 4, a current flowing to the high-potential side FET (QH) is detected by using the sense FET (Q11). Note that they are configured so that a current equal to 1/N of the current flowing through the high-potential side FET (QH) flows through the sense FET (Q11). That is, the size of the sense FET (Q11) is 1/N of the size of the high-potential side FET (QH). In the case where the power-supply apparatus is used for a large current, the value of N may be, for example, 5000 to 20000. Therefore, the sense FET (Q11) needs to have high detection accuracy. Because of this reason, the high-potential side FET (QH) and the sense FET (Q11) are formed on the same semiconductor chip 115. For example, by forming the high-potential side FET (QH) and the sense FET (Q11) on the same semiconductor chip 115, the variations in the threshold voltage Vgs and the pair ratio of on-resistances between those FETs caused by the manufacturing process can be minimized.

Further, since the high-potential side FET (QH) and the sense FET (Q11) operate as source-follower output FETs, it is necessary to make their source potentials equal to each other in order to adjust the current flowing through the sense FET (Q11) to 1/N of the current flowing through the high-potential side FET (QH). For example, by forming the drains and the sources of the high-potential side FET (QH) and the sense FET (Q11) on the same semiconductor chip 115, their voltages can be made equal to each other.

However, when the high-potential side FET (QH) and the sense FET (Q11) are formed on the same semiconductor chip 115, it is impossible to replace the high-potential side FET (QH) alone. That is, the high-potential side FET (QH) and the sense FET (Q11) cannot be separated from each other. Therefore, when the high-potential side FET (QH) is replaced with another high-potential side FET (QH), the sense FET (Q11) also needs to be replaced together with the high-potential side FET (QH).

That is, it is necessary to select the high-potential side FET (QH) and the low-potential side FET (QL) according to the load to which electric power is supplied. However, when a purpose-built sense FET (Q11) is used, a general-purpose high-potential side FET (QH) cannot be used because the sense FET (Q11) is set with a certain high-potential side FET (QH). Therefore, the high-potential side FET to be used cannot be freely selected. Further, since a general-purpose high-potential side FET (QH) cannot be used, the cost for manufacturing the power-supply apparatus increases.

In contrast to this, in the power-supply apparatus according to this embodiment, voltage signals V1 and V2 corresponding to the current flowing to the inductor L1 are generated by the signal generation unit (CR-circuit) 12, and the voltage signals V1 and V2 are converted into a current signal by the trans-conductance amplifier AMP1. Further, the current signal output from the trans-conductance amplifier AMP1 is converted into a voltage signal by using the converter R2, and this voltage signal is used as the feedback signal CS.

Therefore, since the feedback signal CS corresponding to the current flowing to the inductor L1 can be generated without disposing any purpose-built sense FET, the high-potential side FET (QH) to be used can be freely selected. That is, unlike the power-supply apparatus shown in FIG. 4, it is unnecessary to form the high-potential side FET (QH) and the sense FET (Q11) on the same semiconductor chip 115. Therefore, the high-potential side FET (QH) to be used can be freely selected. Further, since a general-purpose high-potential side FET (QH) can be used, the cost for manufacturing the power-supply apparatus can be reduced.

Second Embodiment

Figure 5:
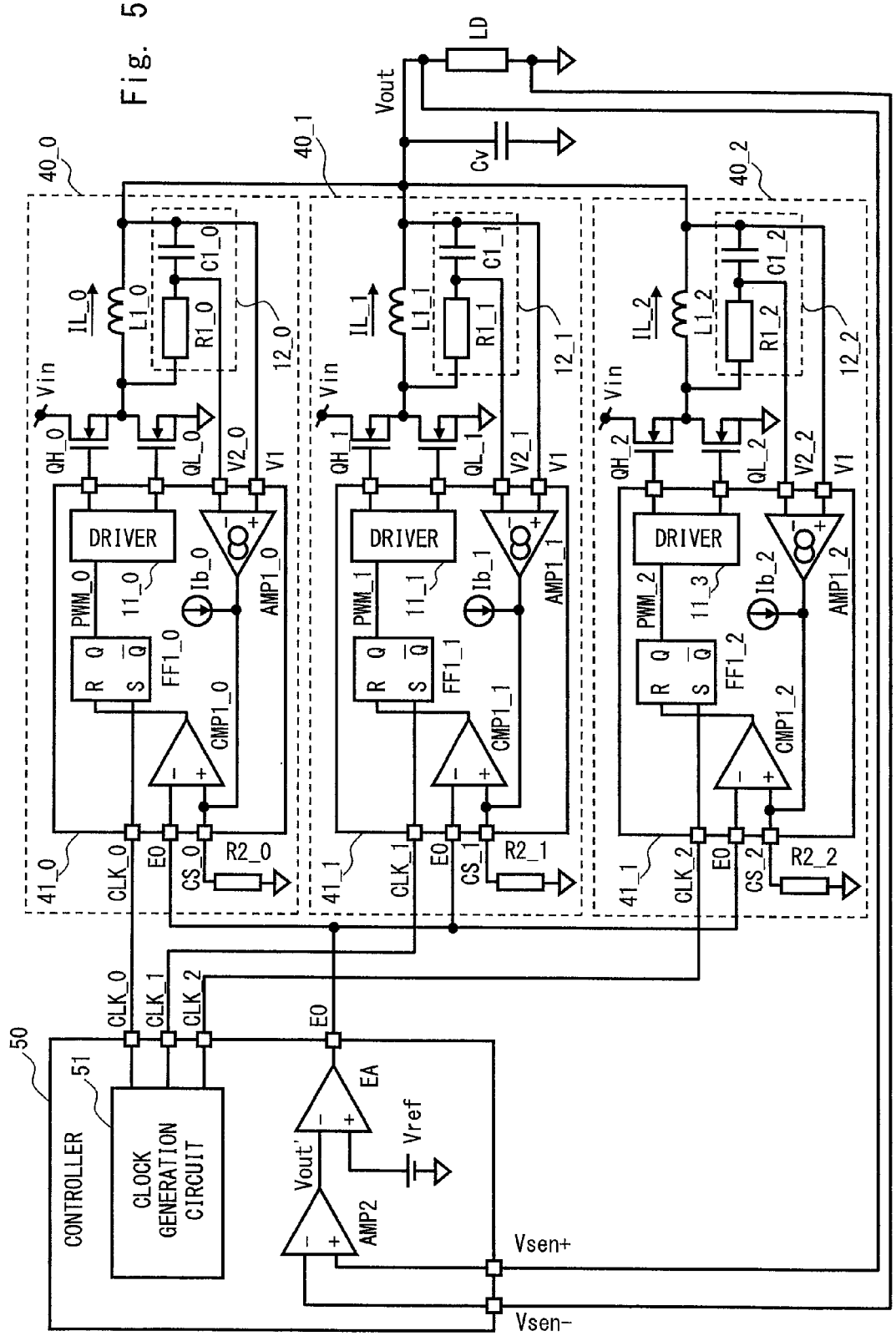
FIG. 5 is a circuit diagram showing a power-supply apparatus according to a second embodiment.

Next, a power-supply apparatus according to a second embodiment is explained. FIG. 5 is a circuit diagram showing a power-supply apparatus according to this embodiment. As a power-supply apparatus according to this embodiment, a case where the power-supply apparatus explained above in the first embodiment is applied to a power-supply apparatus using a multi-phase technique is shown. Note that in FIG. 5, the same components as those in the power-supply apparatus in the first embodiment are denoted by the same reference numerals.

As shown in FIG. 5, a power-supply apparatus according to this embodiment includes a plurality of output stages 40_0 to 40_2 each of which includes, at least, an inductor L1, a high-potential side FET (QH), a low-potential side FET (QL), a signal generation unit 12, a trans-conductance amplifier AMP1, a converter R2, and a control unit 10. Although an example where the power-supply apparatus includes three output stages 40_0 to 40_2 is shown in FIG. 5, the number of the output stages provided in the power-supply apparatus may be arbitrarily determined, provided that the number is greater than one. Further, the power-supply apparatus also includes a controller 50 that controls the plurality of output stages 40_0 to 40_2.

The output sides of the inductors L1_0 to L1_2 of the output stages 40_0 to 40_2 are connected to a load LD. Further, current IL_0 to IL_2 flowing through the respective inductors L1_0 to L1_2 are supplied to the load LD. A capacitive element Cv is disposed between the output sides of the inductors L1_0 to L1_2 and the ground potential. By disposing the capacitive element Cv, the output voltage Vout is smoothed.

Note that in this specification, for the sake of convenience, the inductors of the output stages 40_0, 40_1 and 40_2 are referred to as "inductor L1_0", "inductor L1_1" and "inductor L1_2" respectively. Each of these inductors L1_0 to L1_2 is substantially identical to the inductor L1 shown in FIG. 1. Reference numerals for other components are determined in a similar manner.

The output stage 40_0 supplies a current IL_0 to the load LD. The current IL_0 supplied to the load LD can be adjusted by controlling the on/off timings of the high-potential side FET (QH_0) and the low-potential side FET (QL_0). That is, the high-potential side FET (QH_0) and the low-potential side FET (QL_0) are configured so that they are turned on/off in a complementary manner. Further, by controlling the duty ratio of these on/off operations, the current IL_0 can be adjusted. The duty ratio is determined by detecting the output voltage Vout applied to the load LD and the current IL_0 flowing through the inductor L1_0 and feeding back these two detection results. That is, the power-supply apparatus according to this embodiment is a power-supply apparatus using a peak current control scheme.

The high-potential side FET (QH_0) is disposed between the input voltage Vin and the input side of the inductor L1_0. The low-potential side FET (QL_0) is disposed between the input side of the inductor L1_0 and the ground potential. When the high-potential side FET (QH_0) is in an on-state and the low-potential side FET (QL_0) is in an off-state, a current is supplied to the input side of the inductor L1_0. In this state, a current IL_0 flows to the inductor L1_0 and this current is supplied to the load LD.

On the other hand, when the high-potential side FET (QH_0) is in an off-state and the low-potential side FET (QL_0) is in an on-state, the input side of the inductor L1_0 is brought to a predetermined potential. That is, since the low-potential side FET (QL_0) becomes an on-state, the input side of the inductor L1_0 is connected to the ground potential. Therefore, the counter electromotive force that occurs in the inductor L1_0 can be clamped. Each of the high-potential side FET (QH_0) and the low-potential side FET (QL_0) can be formed by using, for example, an N-channel type vertical power MOSFET.

The signal generation unit 12_0 generates voltage signals V1 and V2_0 corresponding to the current IL_0 flowing to the inductor L1_0. Note that the voltage signals V1 and V2_0 correspond to a voltage difference generated by the DC resistive component DCR of the inductor L1_0. That is, the inductor L1_0 includes an inductive component L and the DC resistive component DCR. Therefore, by detecting the potential difference between the input side and the output side of this DC resistive component DCR, the current flowing through the inductor L1_0 can be detected. As for the voltage signal V1, since the output sides of the inductors L1_0 to L1_2 are connected to the common node, the voltage signal V1 is the common signal.

The signal generation unit 12_0 can be formed by using a CR-circuit including a capacitive element C1_0 and a resistive element R1_0 connected in series. The CR-circuit is connected in parallel with the inductor L1_0. As shown in FIG. 5, one end of the resistive element R1_0 provided in the CR-circuit is connected to the input side of the inductor L1_0, and one end of the capacitive element C1_0 is connected to the output side of the inductor L1_0. Further, the other ends of the resistive element R1_0 and the capacitive element C1_0 are connected to each other. The one end of the capacitive element C1_0 is connected to the non-inverting input of the trans-conductance amplifier AMP1_0 (hereinafter referred to as "amplifier AMP1_0"), and the other ends of the resistive element R1_0 and the capacitive element C1_0 are connected to the inverting input of the amplifier AMP1_0. That is, the potential difference across the capacitive element C1_0 is output to the amplifier AMP1_0 as the voltage signals V1 and V2_0.

In the following explanation, the inductance of the inductor L1_0 is represented as "L1"; the DC resistive component DCR is represented as "R0"; the capacitance of the capacitive element C1_0 is represented as "C1"; and the resistance of the resistive element R1_0 is represented as "R1". It is necessary to make the time constant L1/R0 of the inductor L1_0 equal to the time constant R1*C1 of the CR-circuit. Therefore, the capacitance C1 of the capacitive element C1_0 and the resistance R1 of the resistive element R1_0 of the signal generation unit 12_0 are adjusted so that the relation "L1/R0=R1*C1" is satisfied.

The amplifier AMP1_0 outputs a current according to the voltage signals V1 and V2_0 generated by the signal generation unit 12_0. The current output from the amplifier AMP1_0 is converted into a voltage signal CS_0 by the converter R2_0. For example, the converter R2_0 can be formed by using a resistive element whose one end is connected to the output side of the amplifier AMP1_0 and whose other end is connected to the ground.

Further, a bias current source Ib_0 for supplying a bias current may be disposed on the output side of the amplifier AMP1_0. When the bias current source Ib_0 is provided, a voltage signal that is obtained by converting the total of the current output from the amplifier AMP1_0 and the current supplied from the bias current source by the converter R2_0 is used as the voltage signal CS_0. In other words, the voltage signal CS_0 can be positively biased by an amount equivalent to the current supplied from the bias current source.

The voltage signal CS_0 is supplied to the non-inverting input of the comparator CMP1_0 as a second feedback signal. Further, a first feedback signal EO is supplied to the inverting input of the comparator CMP1_0. The first feedback signal EO is generated by using an amplifier AMP2 and an error amplifier EA provided in the controller 50. Note that the first feedback signal EO is generated by a method similar to that explained in the first embodiment, and therefore a duplicated explanation is omitted.

The comparator CMP1_0 receives the first feedback signal EO and the second feedback signal CS_0 (i.e., the voltage signal CS_0) and outputs a comparison result of these feedback signals to a reset input R of a flip-flop FF1_0. Specifically, the comparator CMP1_0 outputs a high-level signal ("1") to the reset input R of the flip-flop FF1_0 at a timing at which the second feedback signal CS_0 becomes larger than the first feedback signal EO.

A clock signal CLK_0 output from a clock generation circuit 51 provided in the controller 50 is supplied to a set input S of the flip-flop FF1_0. Further, the flip-flop FF1_0 outputs, from its non-inverting output Q, a signal PWM_0 for PWM control to a driver 11_0. The driver 11_0 drives the high-potential side FET (QH_0) and the low-potential side FET (QL_0) according to the signal PWM_0. For example, when the signal PWM_0 is at a high level, the driver 11_0 turns on the high-potential side FET (QH_0) and turns off the low-potential side FET (QL_0). Further, when the signal PWM_0 is at a low level, the driver 11_0 turns off the high-potential side FET (QH_0) and turns on the low-potential side FET (QL_0).

As shown in FIG. 5, the amplifier AMP1_0, the bias current source Ib_0, the comparator CMP1_0, the flip-flop FF1_0, and the driver 11_0 may be formed as one module 41_0. Note that the comparator CMP1_0, the flip-flop FF1_0, and the driver 11_0 correspond to the control unit 10 shown in FIG. 1.

In the power-supply apparatus according to this embodiment, the output stages 40_1 and 40_2, each of which has a configuration identical to that of the above-explained output stage 40_0, are arranged in parallel with each other for the load LD. Note that the configuration of each of the output stages 40_1 and 40_2 is similar to that of the output stage 40_0, and therefore their explanations are omitted.

The controller 50 supplies clock signals CLK_0, CLK_1 and CLK_2 generated in the clock generation circuit 51 to the output stages 40_0, 40_1 and 40_2 respectively. For example, each of the clock signals CLK_0, CLK_1 and CLK_2 is a trigger signal. Further, the frequencies of these clock signals are the same as each other but their phases are different from one another. Further, the controller 50 supplies the common first feedback signal EO to the output stages 40_0, 40_1 and 40_2.

Next, an operation of the power-supply apparatus according to this embodiment is explained with reference to a timing chart shown in FIG. 6. At a timing t11, when a high-level clock signal CLK_0 is supplied from the clock generation circuit 51 to the set input S of the flip-flop FF1_0 provided in the output stage 40_0, the flip-flop FF1_0 outputs a high-level signal PWM_0 from its non-inverting output Q. At this point, since the second feedback signal CS_0 is smaller than the first feedback signal EO, the output of the comparator CMP1_0 remains at the low level. The signal PWM_0 remains at the high level until a high-level signal is supplied to the reset input R.

When the signal PWM_0 becomes a high level, the driver 11_0 turns on the high-potential side FET (QH_0) and turns off the low-potential side FET (QL_0). As a result, a current IL_0 is supplied to the inductor L1_0 and this current IL_0 is supplied to the load LD.

The signal generation unit 12_0 outputs voltage signals V1 and V2_0 corresponding to the current IL_0 flowing through the inductor L1_0. The amplifier AMP1_0 outputs a current according to the voltage signals V1 and V2_0 output from the signal generation unit 12_0. Then, the current output from the amplifier AMP1_0 is converted into the voltage signal CS_0, which is the second feedback signal, by the converter R2_0. When the high-potential side FET (QH_0) is in an on-state, the current continues to be supplied to the inductor L1_0. Therefore, the second feedback signal CS_0, which corresponds to the current flowing to the inductor L1_0, continues to increase.

Further, since the current continues to be supplied to the inductor L1_0, the output voltage Vout also rises. Therefore, the first feedback signal EO corresponding to the output voltage Vout decreases. Note that the output voltage Vout and the first feedback signal EO have such a relation that when the output voltage Vout increases, the first feedback signal EO decreases, and when the output voltage Vout decreases, the first feedback signal EO increases.

Then, at a timing t12, when the second feedback signal CS_0 becomes larger than the first feedback signal EO, the comparator CMP1_0 outputs a high-level signal ("1") to the reset input R of the flip-flop FF1_0. Upon receiving the high-level signal, the flip-flop FF1_0 lowers its non-inverting output Q to a low level. Therefore, the signal PWM_0 becomes a low level.

When the signal PWM_0 becomes a low level, the driver 11_0 turns off the high-potential side FET (QH_0) and turns on the low-potential side FET (QL_0). As a result, the input side of the inductor L1_0 is connected to the ground potential, and the counter electromotive force that occurs in the inductor L1_0 is clamped.

Since the high-potential side FET (QH_0) remains in the off-state after that, no current is supplied to the input side of the inductor L1_0 through the high-potential side FET (QH_0). Therefore, the state where the second feedback signal CS_0 is smaller than the first feedback signal EO is maintained.

Then, at a timing t13, when a high-level clock signal CLK_1 is supplied from the clock generation circuit 51 to the set input S of the flip-flop FF1_1 provided in the output stage 40_1, the flip-flop FF1_1 outputs a high-level signal PWM_1 from its non-inverting output Q. At this point, since the second feedback signal CS_1 is smaller than the first feedback signal EO, the output of the comparator CMP1_1 remains at the low level. The signal PWM_1 remains at the high level until a high-level signal is supplied to the reset input R. The subsequent operations are similar to the above-explained operations of the output stage 40_0, and therefore a duplicated explanation is omitted. Further, the operations of the output stage 40_2 in the timing t15 to t16 are similar to the operations of the output stage 40_0, and therefore a duplicated explanation is omitted.

Figure 6:
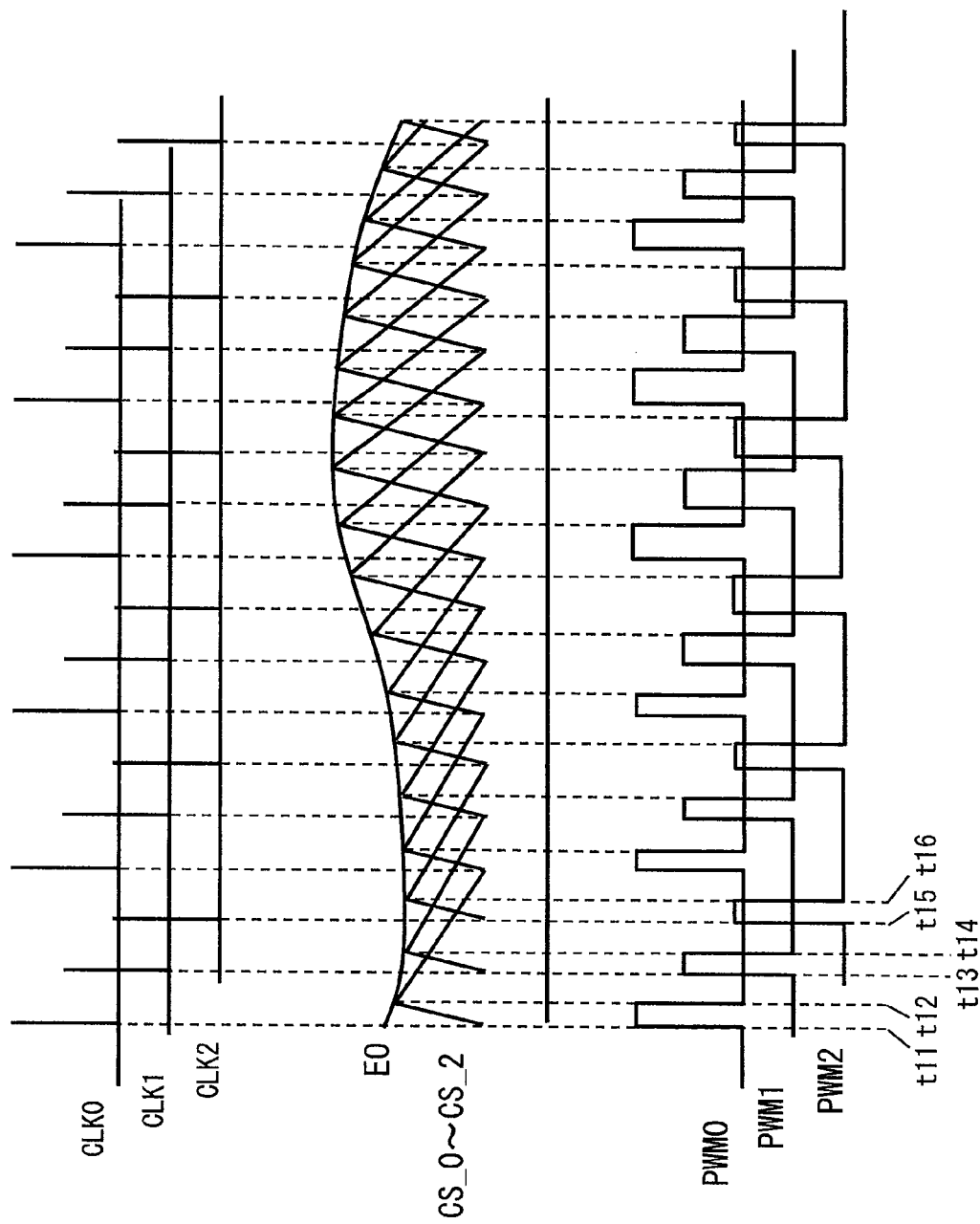
FIG. 6 is a timing chart for explaining an operation of a power-supply apparatus according to a second embodiment.

As shown in FIG. 6, in the power-supply apparatus according to this embodiment, the clock generation circuit 51 supplies the clock signals CLK_0, CLK_1 and CLK_2 having mutually different phases to the output stages 40_0, 40_1 and 40_2 respectively. Therefore, the output stages 40_0, 40_1 and 40_2 can supply the currents IL_0 to IL_2 to the load LD at mutually different timings.

Figure 7:
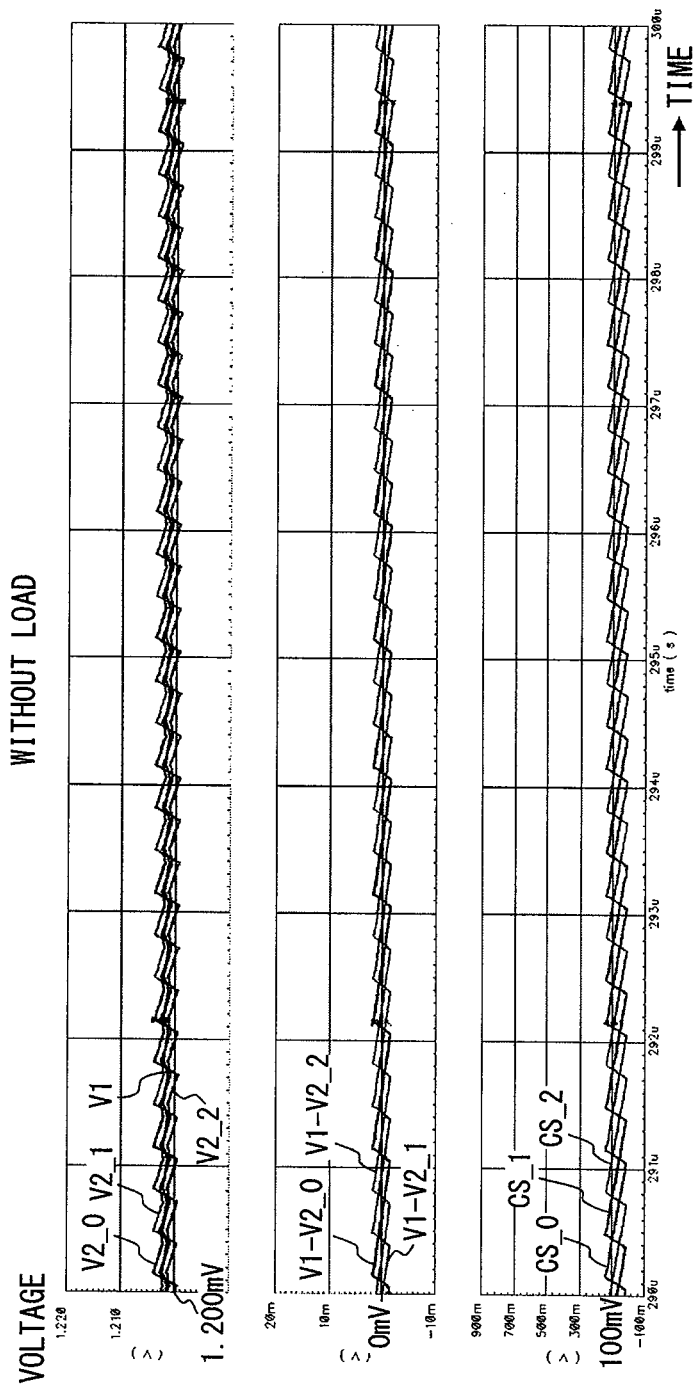
FIG. 7 shows an example of operation waveforms of a power-supply apparatus according to a second embodiment (without load)
Figure 8:
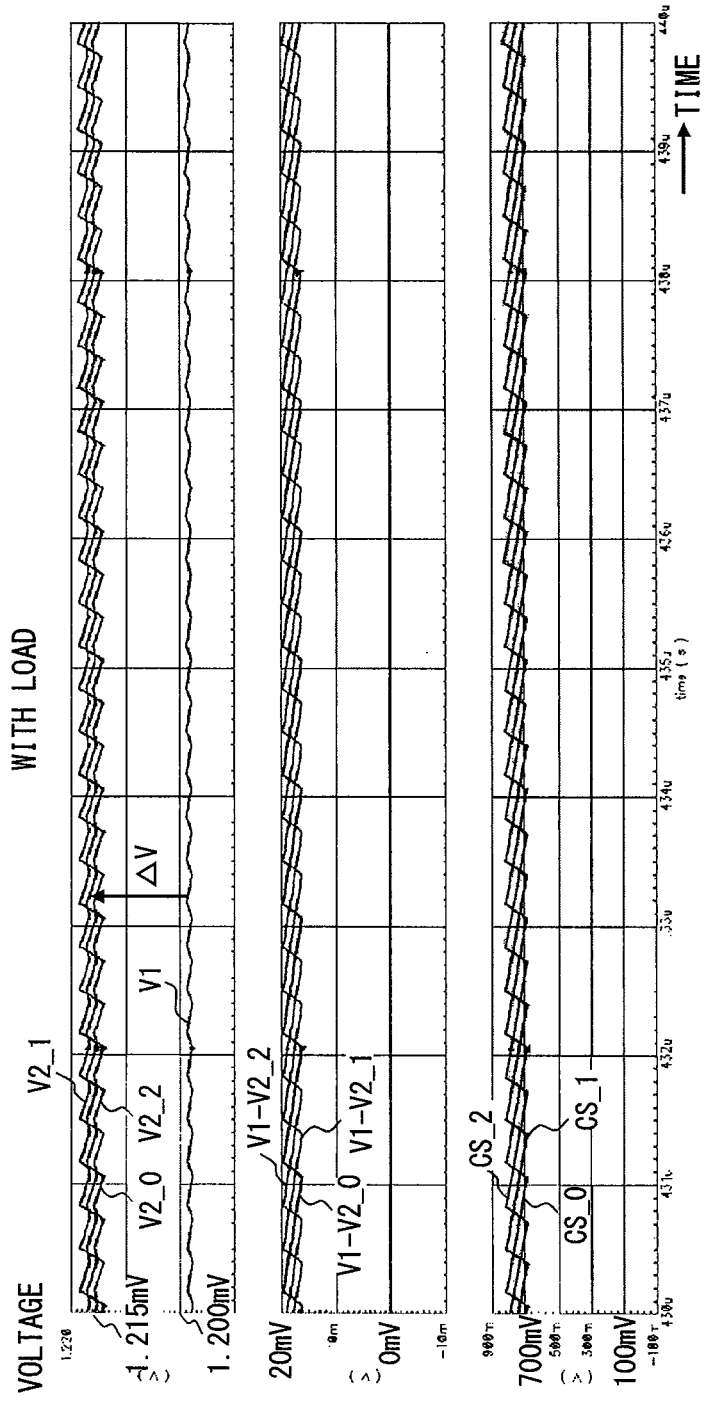
FIG. 8 shows an example of operation waveforms of a power-supply apparatus according to a second embodiment (with load).

FIGS. 7 and 8 show examples of operation waveforms of the power-supply apparatus according to this embodiment. The upper section of each of FIGS. 7 and 8 shows the voltage signals V1 and V2_0 to V2_2 supplied to the amplifiers AMP1_0 to AMP1_2. The middle section shows difference values between the voltage signal V1 and the voltage signals V2_0 to V2_2. The lower section shows the voltage signals CS_0 to CS_2, which are the second feedback signals. Further, FIG. 7 shows operation waveforms in a state where there is no load LD, and FIG. 8 shows operation waveforms in a state where there is a load LD.

As shown in the upper section of FIG. 7, when there is no load LD, the voltage signals V1 and V2_0 to V2_2 supplied to the amplifiers AMP1_0 to AMP1_2 oscillate near 1.200 mV. Note that the voltage signals V2_0 to V2_2 oscillate with their phases being shifted from one another by ⅓ phase. Further, as shown in the middle section of FIG. 7, the difference values between the voltage signal V1 and the voltage signals V2_0 to V2_2 oscillate near 0 mV. Further, as shown in the lower section of FIG. 7, the voltage signals CS_0 to CS_2, which are the second feedback signals, oscillate near 100 mV.

Meanwhile, when there is a load LD, as shown in the upper section of FIG. 8, the voltage signals V2_0 to V2_2 supplied to the amplifiers AMP1_0 to AMP1_2 oscillate near 1.215 mV. Note that the voltage signals V2_0 to V2_2 increase by ΔV with respect to the voltage signal V1. Further, as shown in the middle section of FIG. 8, the difference values between the voltage signal V1 and the voltage signals V2_0 to V2_2 oscillate near 20 mV. That is, the difference values increase with respect to the case where there is no load LD. Further, as shown in the lower section of FIG. 8, the voltage signals CS_0 to CS_2, which are the second feedback signals, oscillate near 700 mV. That is, the voltage signals CS_0 to CS_2 increase compared to the case where there is no load LD.

Note that the differences between the voltage signal V1 and the voltage signals V2_0 to V2_2 correspond to the magnitudes of the currents IL_0 to IL_2 flowing through the inductors L1_0 to L1_2. Therefore, when there is a load LD, the currents IL_0 to IL_2 flowing through the inductors L1_0 to L1_2 also increase. Consequently, the voltage signals CS_0 to CS_2, which are the second feedback signals, also increase.

In a power-supply apparatus using a switching scheme, there is a problem that when the amount of current supplied to the load LD increases, the on-resistance loss, the heat generation, and so on of the switching transistors (i.e., high-potential side FET and low-potential side FET) increase as a result of the increased current. This problem can be solved by using a multi-phase technique. That is, by connecting a plurality of output stages 40_0 to 40_2 in parallel with each other for the load LD and supplying clock signals having mutually different phases to the respective output stages 40_0 to 40_2 as in the case of the above-explained power-supply apparatus, currents IL_0 to IL_2 can be supplied from the respective inductors L1_0 to L1_2 in a distributed manner.

By using the multi-phase technique as described above, the increases in the on-resistance loss, the heat generation, and so on of the switching transistors can be prevented or reduced. Further, the more the number of output stages is increased, the more the ripple voltage can be reduced. Further, the amount of current flowing to each inductor can also be reduced. As a result, the inductance of each inductor can be reduced, thus making it possible to increase the response speed of the power-supply apparatus. Further, the current flowing to the load LD can be easily increased by increasing the number of output stages.

Further, similarly to the first embodiment, in the power-supply apparatus according to this embodiment, the feedback signals CS_0 to CS_2 corresponding to the currents flowing to the inductor L1_0 to L1_2 can be generated without disposing any purpose-built sense FET, thus making it possible to freely select the high-potential side FET to be used. Further, since a general-purpose high-potential side FET can be used, the cost for manufacturing the power-supply apparatus can be reduced.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that the Applicant's intent is to encompass equivalents of all claim elements, even if amended later during prosecution.

What is claimed is:

1. A power-supply apparatus comprising:
   an inductor;
   a first transistor that supplies, in an on-state, a current to an input side of the inductor;
   a second transistor that becomes, when the first transistor is in an off-state, an on-state and thereby brings the input side of the inductor to a predetermined potential;
   a signal generation unit that generates a first voltage signal corresponding to a first current flowing to the inductor;
   a trans-conductance amplifier that outputs a second current according to the first voltage signal generated by the signal generation unit;
   a converter connected to an output side of the trans-conductance amplifier that converts the second current output from the trans-conductance amplifier into a second voltage signal; and
   a control unit that receives a first feedback signal corresponding to a voltage on an output side of the inductor and a second feedback signal, which is the second voltage signal, and controls the first and second transistors based on the first feedback signal and the second feedback signal.

2. The power-supply apparatus according to claim 1, wherein the first voltage signal corresponds to a voltage difference generated by a DC resistive component of the inductor.

3. The power-supply apparatus according to claim 1, wherein
   the signal generation unit comprises a CR-circuit connected in parallel with the inductor, the CR-circuit comprising a capacitive element and a first resistive element connected in series, and
   the signal generation unit outputs a voltage difference across the capacitive element as the first voltage signal.

4. The power-supply apparatus according to claim 3, wherein the CR-circuit is configured so that a relation "L1/R0=R1*C1" is satisfied, where: an inductance of the inductor is L1; a DC resistive component of the inductor is R0; a capacitance of the capacitive element is C1; and a resistance of the first resistive element is R1.

5. The power-supply apparatus according to claim 3, wherein
   one end of the first resistive element is connected to the input side of the inductor,
   one end of the capacitive element is connected to the output side of the inductor,
   another end of the first resistive element and another end of the capacitive element are connected to each other,
   the one end of the capacitive element is connected to a non-inverting input of the trans-conductance amplifier, and
   the another end of the first resistive element and the another end of the capacitive element are connected to an inverting input of the trans-conductance amplifier.

6. The power-supply apparatus according to claim 1, wherein the converter comprises a second resistive element, one end of the second resistive element being connected to the output side of the trans-conductance amplifier, and another end of the second resistive element being connected to a ground.

7. The power-supply apparatus according to claim 1, further comprising a bias current source that supplies a bias current to an output side of the trans-conductance amplifier.

8. The power-supply apparatus according to claim 1, wherein when a voltage of the first feedback signal is larger than a voltage of the second feedback signal, the control unit turns on the first transistor and turns off the second transistor.

9. The power-supply apparatus according to claim 1, further comprising:
   a first semiconductor chip comprising the first transistor;
   a second semiconductor chip comprising the second transistor; and
   a third semiconductor chip comprising the trans-conductance amplifier and the control unit.

10. The power-supply apparatus according to claim 9, wherein the first to third semiconductor chips are mounted on a same package substrate.

11. A power-supply apparatus, comprising: a plurality of output stages, each of the output stages including:
    an inductor;
    a first transistor that supplies, in an on-state, a current to an input side of the inductor;
    a second transistor that becomes, when the first transistor is in an off-state, an on-state and thereby brings the input side of the inductor to a predetermined potential;
    a signal generation unit that generates a first voltage signal corresponding to a first current flowing to the inductor;
    a trans-conductance amplifier that outputs a second current according to the first voltage signal generated by the signal generation unit;
    a converter connected to an output side of the trans-conductance amplifier that converts the second current output from the trans-conductance amplifier into a second voltage signal; and
    a control unit that receives a first feedback signal corresponding to a voltage on an output side of the inductor and a second feedback signal, which is the second voltage signal, and controls the first and second transistors based on the first feedback signal and the second feedback signal.

12. The power-supply apparatus according to claim 11, wherein
    the output side of each of the inductors is connected to a load, and a clock signal having a mutually different phase and a common first feedback signal are supplied to each of the control unit.

* * * * *